United States Patent
Sauvageot et al.

[11] Patent Number: 6,128,488
[45] Date of Patent: Oct. 3, 2000

[54] NON-GEOSTATIONARY SATELLITE COMMUNICATION SYSTEMS, AND STATION AND TERMINAL THEREOF

[75] Inventors: Anne Sauvageot, Paris; Denis Rouffet, Boulogne Billancourt; Didier Casasoprana, St Germain en Laye, all of France

[73] Assignee: Alcatel N.V., Rijswijk, Netherlands

[21] Appl. No.: 08/661,665

[22] Filed: Jun. 11, 1996

[51] Int. Cl.[7] .................................................. H04Q 7/20
[52] U.S. Cl. ........................................ 455/428; 455/442
[58] Field of Search .................................. 455/422, 427, 455/428, 429, 430, 12.1, 13.1, 13.2, 13.3, 517, 513, 436, 437, 442

[56] References Cited

U.S. PATENT DOCUMENTS

| | | | |
|---|---|---|---|
| 5,050,234 | 9/1991 | Ohteru | 455/513 |
| 5,101,501 | 3/1992 | Gilhousen et al. | 455/442 |
| 5,404,568 | 4/1995 | Yamagishi | 455/12.1 |
| 5,408,237 | 4/1995 | Patterson et al. | 455/12.1 |

FOREIGN PATENT DOCUMENTS

| | | |
|---|---|---|
| 0177966 | 4/1986 | European Pat. Off. . |
| 0421698 | 4/1991 | European Pat. Off. . |
| 0536033 | 4/1993 | European Pat. Off. . |

*Primary Examiner*—Reinhard J. Eisenzopf
*Assistant Examiner*—Sam Bhattacharya
*Attorney, Agent, or Firm*—Sughrue, Mion, Zinn, Macpeak & Seas, PLLC

[57] ABSTRACT

A communication system comprising a set of non-geostationary satellites provides communication links between ground stations and terminals, a communication link from a particular station via a satellite terminating at associated terminals in a limited geographical area including the station and providing a communication channel to at least some of the associated terminals. The communication link is switched to another satellite during the process of communication link handover. A communication link between a particular station and its associated terminals includes an additional communication channel which enables advance data to be transmitted between the particular station and a terminal before the latter executes a communication link handover. This data masks any interruption of communication caused by the communication link handover.

8 Claims, 3 Drawing Sheets

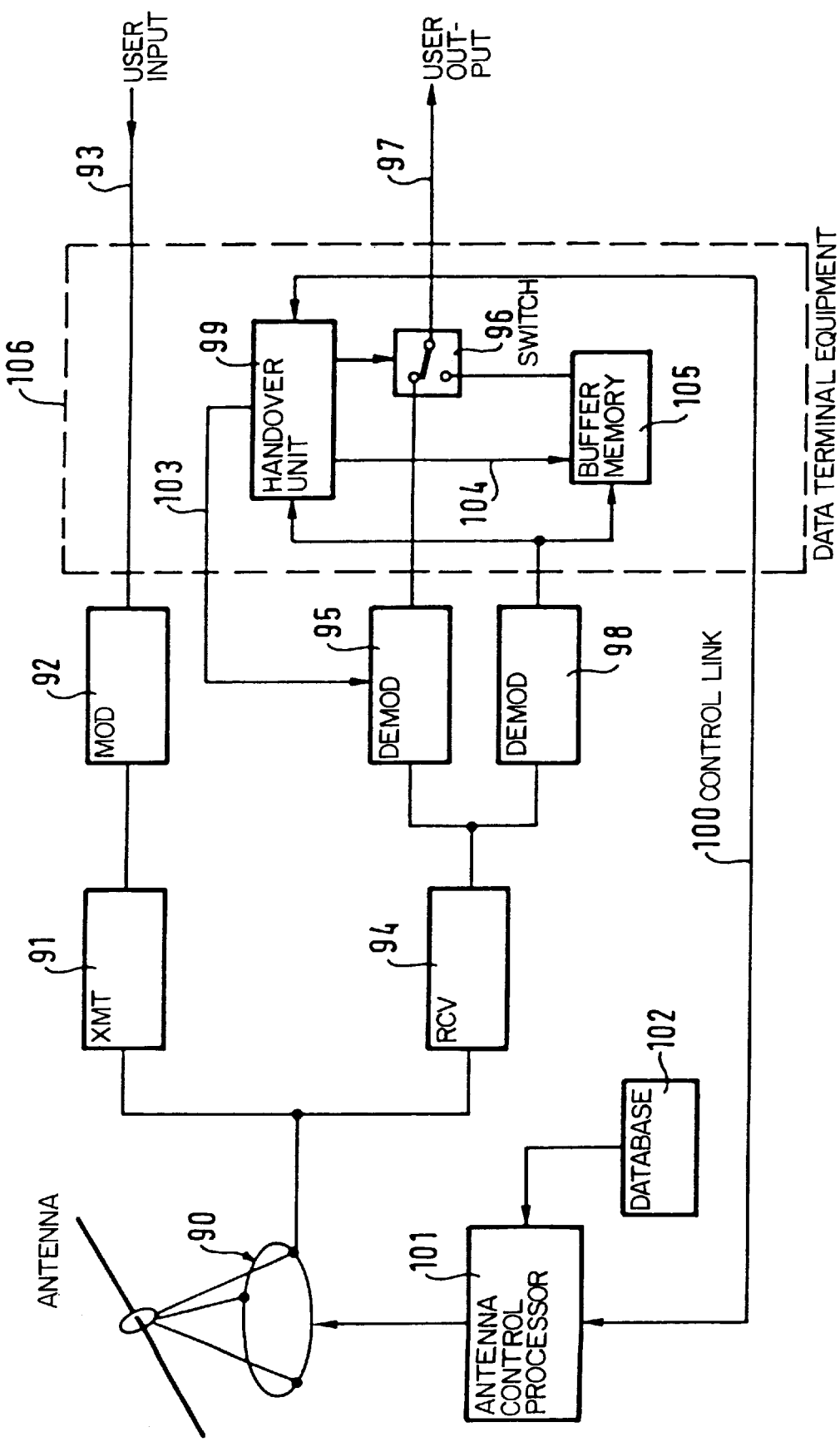

NON-GEOSTATIONARY SATELLITE COMMUNICATION SYSTEMS, AND STATION AND TERMINAL THEREOF

BACKGROUND OF THE INVENTION

1. Field of the Invention

The present invention concerns a communication system comprising a set of non-geostationary satellites providing communication links between ground stations and terminals, a communication link originating from a particular station and passing through a satellite terminating at associated terminals located within a limited geographical area including that station and providing a communication channel for at least some of said associated terminals, this communication link being subsequently transferred to another satellite in a procedure referred to herein as communication link handover.

2. Description of the Prior Art

A system of this type is described in the article "GLOBALSTAR: a transparent system" by D. Rouffet, published in the journal Revue des Télécommunications, 1st quarter of 1993, and in the documents cited in the bibliography of the article.

In the system described in the above document the terminals are mobile rather than fixed. They have an omnidirectional antenna and communicate with the satellite(s) providing them with the strongest signal. Each satellite covers a plurality of areas on the ground by means of a plurality of beams with different carrier frequencies, and these areas (called "footprints") moves as the satellite moves. As seen from the ground, the movement of the footprints means that the stations and the terminals must frequently change frequency, which compromises the overall efficiency of communication. Moreover, the bandwidth that can be transmitted between a station and an associated terminal in this system is relatively small.

The present invention concerns a system in which the number of frequency changes is considerably reduced and which provides broadband links between stations and terminals.

Copending application Ser. No. 08/574309 filed Dec. 18, 1995 describes one communication system meeting these objectives in which the link between a particular station of this kind and the associated terminals is set up by a satellite from said set of satellites which is commanded to set up to this end a steerable transmit beam and a steerable receive beam pointing to one such limited area including said particular station and supporting said communication link.

The use of steerable beams that do not move relative to the ground enables one satellite to set up and to maintain a communication link between a station and its terminals while moving from one horizon as seen from the station, to the other horizon, i.e. for as long as possible, given that the satellites are non-geostationary, which contributes to reducing switching between links and therefore to improving the overall transmission efficiency.

By a process that is conventional in other applications, not only the stations but also the terminals communicate through the intermediary of the satellites using steerable antennas, which requires at least two antennas per station.

The invention is directed to enabling the use in a system of this kind of terminals having only one antenna or, more generally, terminals such that communication is interrupted at the time of link handover.

SUMMARY OF THE INVENTION

In one aspect, the invention consists in a communication system comprising a set of non-geostationary satellites providing communication links between ground stations and terminals, a communication link from a particular station via a satellite terminating at associated terminals in a limited geographical area including said station and providing a communication channel for at least some of said associated terminals, said communication link being subsequently transferred to another satellite during the process of communication link handover, in which system a communication link between a particular station and its associated terminals includes an additional communication channel adapted to enable advance data to be transmitted between said particular station and a terminal before the latter executes communication link handover, said data masking any interruption of communication caused by said communication link handover.

Said advance data includes data that would normally be transmitted between said particular station and said terminal for a period equal to that required in said terminal to execute a communication link handover.

If said terminal has a single steerable antenna, said required period essentially comprises the maximal time to repoint said antenna from one satellite of the communication system to another and the resynchronization time.

Said terminal includes an additional receive subsystem that is part of said additional communication channel, a memory for storing data supplied by said additional receive subsystem when transmitted to it by said particular station and additional switching means operative at the time of communication link handover in the terminal so that data in memory is fed to said communication channel of said terminal when it is interrupted by communication link handover in said terminal.

In a different embodiment, the additional communication channel uses the receive subsystem of the nominal communication channel.

At the time of communication link handover, said station is advantageously adapted to transmit to a new satellite without ceasing to transmit to an old satellite, to select a first active terminal, to obtain advance data to be transmitted to said terminal, to transmit said advance data to said terminal over said additional communication channel, to transmit to said first terminal a communication link handover instruction, to select a second active terminal, and to continue this process until communication link handover has been completed in all active terminals, after which said particular station ceases to transmit to said old satellite.

Advantageously, selection of said first active terminal is accompanied by selection of at least one other active terminal, said data is obtained from the selected active terminals and said data is transmitted by said selected active terminals, as a result of which communication link handover is effected in groups of terminals.

The various objects and features of the invention will now be explained in detail in the following description of one embodiment of the invention given by way of non-limiting example and with reference to the appended drawings.

BRIEF DESCRIPTION OF THE DRAWINGS

FIG. 3 is a block diagram of the equipment in accordance with the present invention in a terminal of the system from FIG. 1.

DETAILED DESCRIPTION OF THE PREFERRED EMBODIMENT

Figure 1:
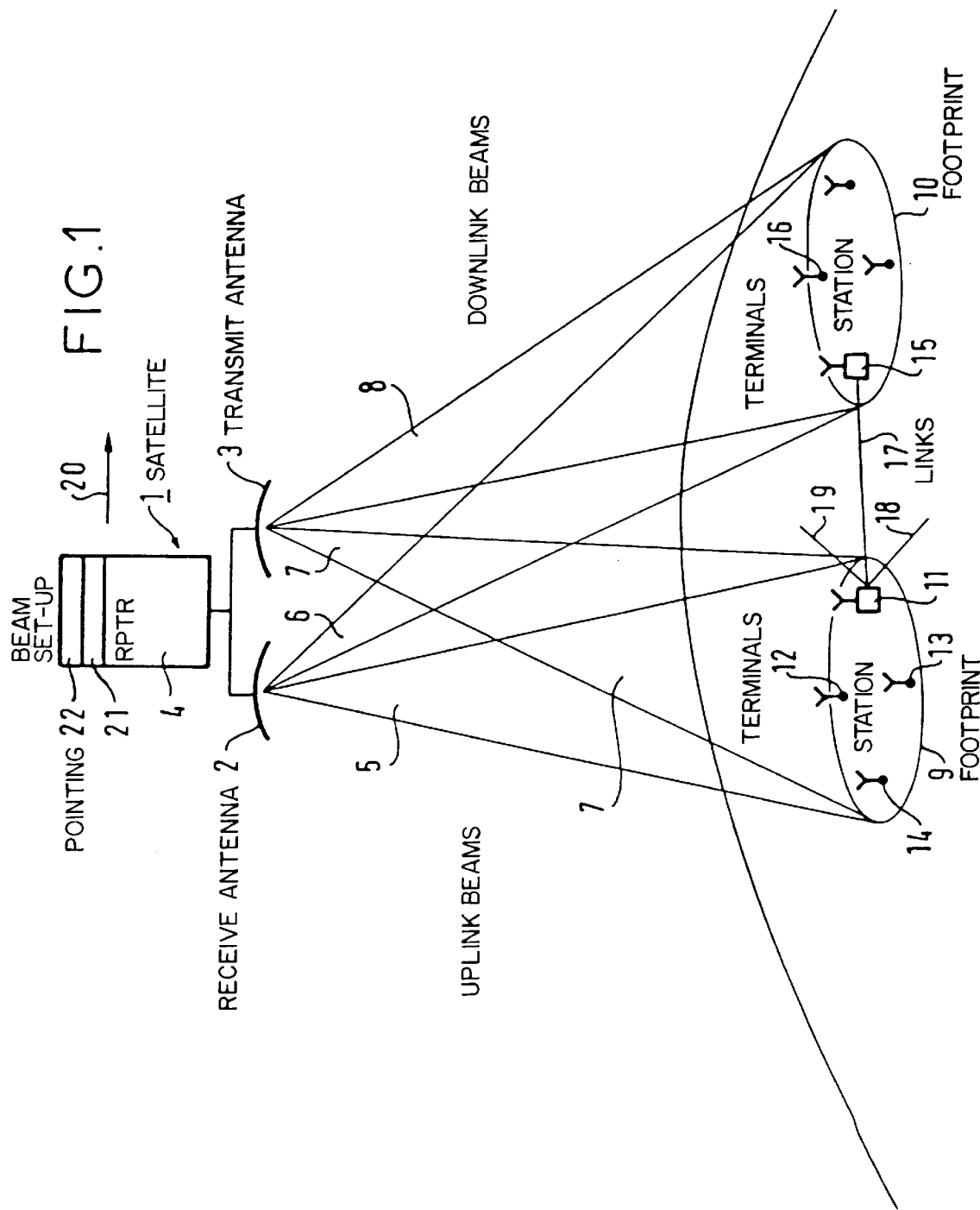
FIG. 1 is a diagrammatic representation of a non-geostationary satellite communication system to which the present invention may be applied.

FIG. 1 is a highly schematic representation of the non-geostationary satellite communication system to which the present invention applies. It comprises a set of non-geostationary satellites, of which the figure shows only one satellite 1. That satellite has a receive antenna 2 and a transmit antenna 3, between which is a repeater 4. The signals received from the Earth via the receive antenna 2 are amplified in the repeater 4 and retransmitted towards the Earth via the transmit antenna 3. Thus from the call management point of view the satellite 1 is transparent. It merely constitutes a relay station between sources and recipients of signals which are both on the ground. This reduces the cost of the space segment.

To be more precise, the antennas 2 and 3 are each associated with a multiplicity of beams. The antenna 2 is associated with uplink beams, including the beams 5 and 6, for example. Likewise, the antenna 3 is associated with downlink beams including the beams 7 and 8. These beams can have different characteristics (frequency, polarization, bandwidth, etc). Array antennas can be used in this application, as is well known in the art. A description of one such system can be found in the article "A Ku Band Antenna Program" by D. Michel et al, published in the minutes of the "15th International Communications Satellite Systems Conference", organized by the AIAA, from Feb. 27 through Mar. 3, 1994. An uplink beam, for example the beam 5, and a downlink beam, for example the beam 7, cover the same limited geographical area ("footprint") 9 on the surface of the Earth. Likewise, the beams 6 and 8 cover another footprint 10.

An area like the area 9 includes a station 11 and terminals 12, 13, 14. The station 11 communicates with the terminals 12, 13, 14 via a satellite 1 the transmit and receive beams of which cover the area 9 that contains the station and the associated terminals. The signals transmitted by the station are relayed to the terminals by the satellite. Likewise, the signals transmitted by the terminals are relayed to the station by the satellite. This provides a communication link between them. The same applies in the case of the area 10 containing a station 15 and terminals 16 that communicate with each other in the manner just mentioned, The communication link between a station of this kind and the associated terminals can be operated in the same way as in terrestrial mobile radio systems, for example; the communication link then provides a plurality of different frequency channels, at least some of those channels being time-division multiplexed to carry more than one call. The terminals call the station on an access channel common to them and the station responds on a control channel. Conflicts for access to the access channel can be managed by a conventional procedure of the "ALOHA" or "slotted-ALOHA" type. The control channel assigns a time slot in each transmission direction between a terminal and the station. Communication can then take place, for example between the terminal 14 and the station 11. The latter can connect the terminal 14 to another terminal, for example the terminal 12, by similar means. Via links 17, 18, 19 it can also extend the call to other stations, in particular the station 15, or to other networks, depending on the site to which another terminal to which the terminal 14 requests access is connected.

The links between stations can be terrestrial links or satellite links. The same satellites can be used for this purpose. They then carry an additional communication system, similar to that of the invention, reserved for communications between stations and rated accordingly. In particular, the footprints will be relatively large, in order to contain several stations.

As the satellite is transparent, the communication link between the station 11 and the associated terminals 12, 13, 14 is a multiplexed link from the station to all the terminals. It may comprise one or more different channels each carrying one or more time-division multiplexed signals, for example asynchronous time-division multiplexed signals. Suffice to say, in the context of the present invention, that techniques well known in themselves and proven in the field of terrestrial communications are used.

In the system to which the invention is addressed, the satellite 1 is a non-geostationary satellite that moves in the direction of the arrow 20. This means that, to cover the areas 9 and 10 at all times, the beams 5 through 8 must be pointed at these areas and track them. To this end the satellite 1 includes a beam pointing device 21 containing an ephemeris that is read periodically and that supplies the beam pointing coordinates as the satellite moves overhead, in order that the beams remain pointed at the areas 9 and 10 as long as the satellite 1 is in view of the latter. Array antennas of the type previously mentioned meet this requirement.

The satellite 1 will finally cease to be visible from the area 9, for example. Before this happens, the beams 5 and 7 must be turned off. Another satellite, similar to the satellite 1, is used in place of the satellite 1 to maintain the communication link between the station 11 and the terminals 12, 13, 14 using beams similar to the beams 5 and 6, in exactly the same way as when the satellite 1 came previously into view of the areas 10 and 9.

To this end the satellite includes beam set-up means 22 to set up beams providing the necessary communication links for the areas overflown by the satellite.

As the route of the satellite is known in the stations, each of the latter requests the satellite 1, on rising above the horizon, to set up the beams that it needs; thus the station 11, when the satellite 1 rises above the horizon, transmits a message on a control channel (not shown in FIG. 1) to the beam set-up means 22 to cause the satellite to set up the beams 5 and 6. The stations like the station 11, connected by the links 17, 18, 19, etc, naturally coordinate their connection requests beforehand, allowing for the communication capacity of the satellite, so that the needs of the various stations can always be met.

The station 11 is additionally adapted to command linking up to the satellite 1 by transmitting it data which identifies it and specifies the beams to be set up; the satellite is adapted to verify that the station belongs to the communication system and to set up the requested beams accordingly. This is to prevent fraudulent access to the satellite.

In one variant the beams are set up on the basis of data stored on the satellite and consulted as the satellite travels around the Earth.

In another variant the data is stored in the stations and supplied to the satellite.

The communication system of the invention comprises a set of satellites capable of providing at all times the communication links required by each station to communicate with the associated terminals in its area. To provide a permanent service each station must be able at all times to see at least one satellite capable of providing it with a communication link with the associated terminals and a second satellite rising above the horizon before that currently linking it to its terminals has moved too far away.

This requires the stations to have at least two antennas associated with two radio subsystems in order to be able to transfer the communication link from an "old" satellite to a "new" satellite without loss of call data. These antennas are high-gain steerable antennas.

The present invention is more particularly concerned with the problem of the terminals. They must also be provided with directional antennas. Normally each terminal would be equipped with at least two directional antennas, on the same terms as the stations. For economic reasons these antennas should be small in size, for example 30 cm in diameter. Steerable antennas of this kind are available off the shelf, for example for direct reception of television broadcasts from geostationary satellites. However, although the antennas are of moderate cost, a system with two antennas is still relatively costly. The invention is therefore aimed at offering a more economic solution to at least some terminal users.

The system of the invention is such that the terminals need only one low-cost steerable antenna of the indicated type. To this end, the stations and the terminals are adapted so that an additional communication channel transmits advance data between a particular station and a terminal before the latter executes communication link handover to alleviate the interruption of communication caused by the communication link handover procedure.

Figure 2:
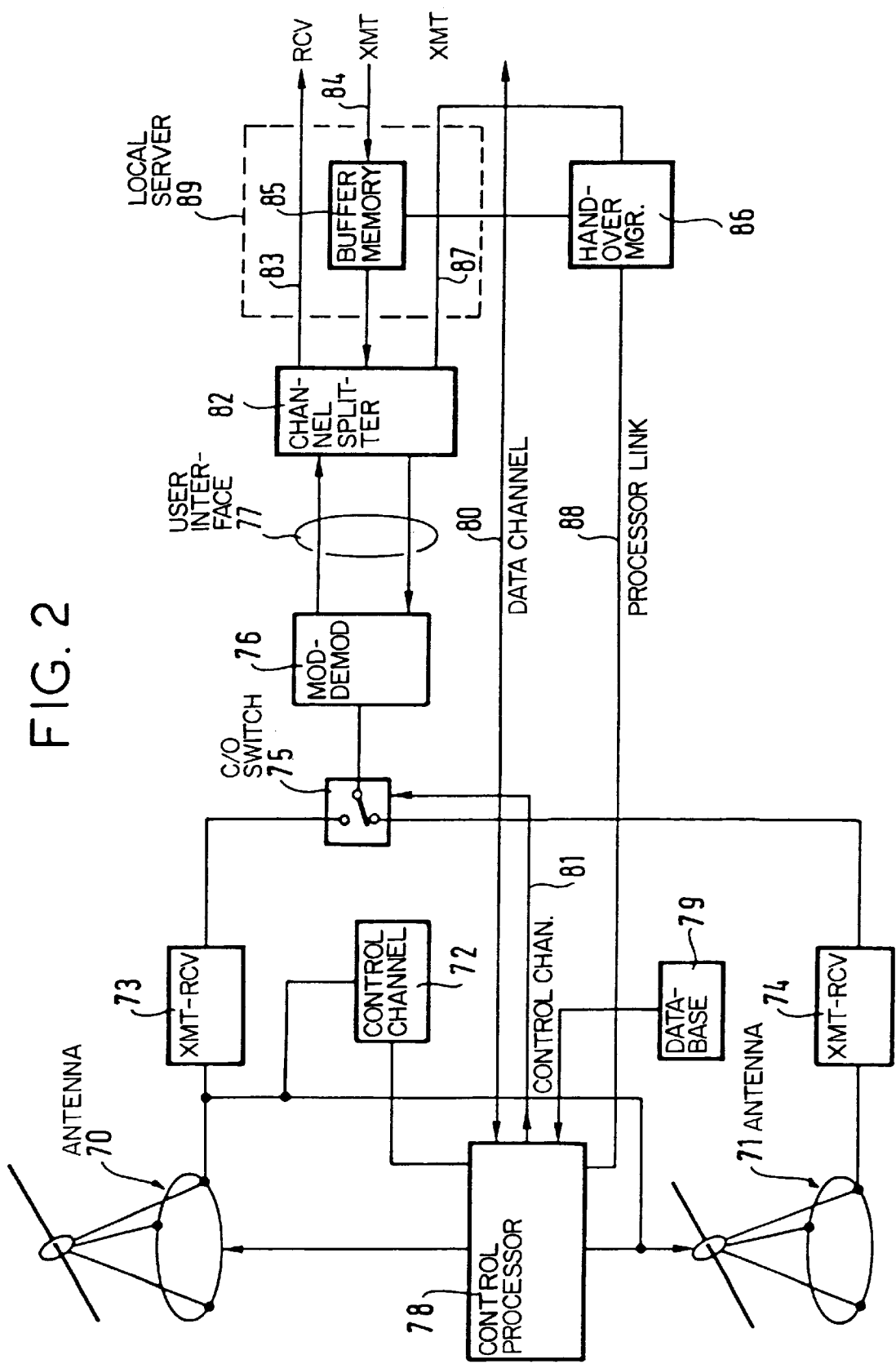
FIG. 2 is a block diagram of the equipment in accordance with the present invention in a station of the system from FIG. 1.

FIG. 2 is a highly schematic representation of a station in accordance with the invention.

The station in FIG. 2 has two antennas 70 and 71 each coupled to a transmit/receive subsystem 73, 74 one of which is connected by a changeover switch 75 to a modulator/demodulator system 76 connected to a user interface 77. The two antennas are steered by a control processor 78 using a database 79.

Additionally, a data channel 80 enables the processor 78 to communicate in both directions with a pilot station, for example, able to supply it with data to be stored in the database 79. As previously indicated, this data channel can be provided by the satellites of the communication system, which are provided with additional means for this purpose.

The processor 78 and the database 79 point the antennas 70 and 71 at first and second satellites. One of the two satellites provides a communication link for the station in question, that pointing the antenna 71 for example, and the switch 75 is set accordingly, as shown in FIG. 2, via a control channel 81 and under the control of the processor 78.

In this way the station 11 (for example) communicates with the satellite via the user interface 77 and with the terminals in its area via the satellite, since the satellite is transparent from the communication point of view.

When the first satellite moves away, the changeover switch 75 is switched to the antenna 70 which points at a second satellite that is to provide a communication link in place of the first.

The station also has a control channel 72 connected to the antenna 70 or 71 steered by the processor 78 to transmit data to the satellite. The station transmits control data to the satellite on this control channel, as previously described.

The data in question, reaching the station via the link 80, is first stored by the processor 78 in the database 79, which therefore contains not only the control data that it needs to acquire and to track the satellites of the communication system but also the data to be transmitted to the satellites.

The station in FIG. 2 can therefore act as a pilot station and transmit a complete set of control data to each satellite of the system.

Alternatively, each of the stations like that in FIG. 2 can be restricted to transmitting to each satellite with which it communicates the data enabling it to set up a communication link for its use.

In this case the station must also transmit a command to clear down the link at a later time.

As a further alternative, the control channel can provide the satellite with control data from the database 79 as and when it requires it.

For the specific requirements of the present invention, the station in FIG. 2 has a channel splitter 82 based on the technique previously mentioned of using communication channels offered by the communication link set up by the satellite 1 in FIG. 1. In particular it separates the receive channel 83 and the communication channel 84 assigned to any active terminal, for example that in FIG. 3. Other, similar channels correspond to other terminals active at the same time. The communication channels in general and the communication channel 84 in particular are provided with a data buffer memory 85. A handover manager 86 controlling the buffer memory 85 also has access to an additional communication channel 87 of the communication link at the interface 77 and communicates with the processor 78 over a link 88.

The above means operate in the manner described below. The data from the communication channel 84 is stored in the buffer memory 85. The process by which the data to be transmitted is called up and stored in the buffer memory is conventional in the database management art. In this respect, each communication channel constitutes a local server, represented by the dashed outline rectangle 89 (the remote server is not shown). In the case of a linear video program server, such as a television show or cinema film server, the buffer memory calls up data in bursts representing between a few seconds and a few minutes of program, which data is then transmitted in a quasi-continuous fashion. In the case of a database or any other source of that type, the buffer memory calls up in the same way screens that are logically related to that transmitted and which are therefore available for quasi-immediate response to the user commands received over the channel 83.

The handover manager is advised by the processor 78 of the identity of a terminal which must soon carry out a communication link handover. This obviously occurs after the processor 78 of the station in FIG. 2 has requested a new satellite to set up beams for its use, where necessary. The manager 86 then reads in the buffer memory 85 corresponding to that terminal data that would normally be transmitted to that terminal at some future time. It does this for a period of time equal to that needed for the terminal to complete communication link handover. The manager 86 transmits a communication link handover instruction to the terminal in question after this data.

Accordingly, before carrying out a handover, the terminal receives advance data corresponding to the period of time in which handover would otherwise interrupt communication. It uses this data to maintain the communication channel locally and thus to mask the interruption.

The process is therefore based on transmitting advance data. It goes without saying that the invention does not apply only to situations in which it is possible to transmit advance data in the manner described. For other types of communication the means of the invention may be present and may be utilized, but will not achieve the required result, which is to mask the interruption of communication. The interruption will be perceptible to the user.

After proceeding as just described, the manager 86 reports to the processor 78 which then requests it to repeat the operation on behalf of another active terminal, and so on.

When the manager 86 reports that handover has been completed for the last active terminal, the processor 78 can abandon the communication link via the old satellite, requesting it to clear down the beams. With no other action being required, the new satellite then provides the communication link for the FIG. 2 station.

The same means as just described, namely the processor 78, the link 88, the handover manager 86, the communication channel 87 and the interface 77 also enable the station from FIG. 2 to reach and to control the tracking control processor of each of the active terminals (the equivalent of the processor 78, except that it is in the terminal). The messages containing the information identifying and enabling tracking of the satellite to be tracked next are transmitted to it at leisure when a handover has just been completed.

The figures do not show terminals with two antennas which lie outside the scope of the present invention. FIG. 2 applies for the most part to a terminal of this kind.

It may be mentioned that the latter terminal, like a station, also has two steerable antennas and two transmit/receive subsystems selected by a changeover switch. The user interface delivers the entire spectrum of the communication link. The communication channel actually used by the terminal in communicating with the station is determined by the procedure mentioned above and which is outside the scope of the present invention.

Likewise, the terminal has a processor and a database for pointing its antennas under the conditions previously specified. The data written into the database is transmitted to it by the associated station, over the control link 82/83 or any equivalent of the latter link. In another variant, the data is introduced directly into the terminal.

An outline description of a terminal in accordance with the invention will now be given with reference to FIG. 3.

This terminal has only one steerable antenna 90 with two degrees of freedom, coupled to a transmit subsystem 91 preceded by a modulator 92 connected to a user input 93. The antenna 90 drives a receive subsystem 94 receiving the frequency band of the communication link. It is followed by a demodulator 95 separating out a communication channel which is connected to a user output 97 via a switch 96 that is normally in the position shown. A satellite being in view and providing the communication link, the means just described provide communication between the user interface 93, 97 and the station from FIG. 2 (for example channels 83, 84).

In one variant, the receive subsystem also feeds another demodulator 98 isolating an additional communication channel that corresponds to the channel 87 from FIG. 2. In another variant the additional communication channel uses the receive subsystem of the nominal communication channel, for example using a particular time-division multiplex channel separated out by the demodulator 95. This communication channel is connected to a handover unit 99 subordinate to the handover manager 86 from FIG. 2 but operative for the terminal of FIG. 3 only. This handover unit receives information relating to the next satellite to be used, transmitted via a control link 100 to an antenna control processor 101 with a database 102. The information relating to the next satellite is stored in the database 102. This information can describe the trajectory of the next satellite completely, or merely enable reference to an ephemeris previously transmitted to or downloaded into the terminal, or merely enable the trajectory to be calculated. The unit 99 can receive the identity of a communication channel assigned temporarily to the FIG. 3 terminal from the processor 78 via the data channel 80 (see FIG. 2). This information is communicated over a link 103 to the demodulator 95 to enable it to select this communication channel. The demodulator 98 also supplies the advance data previously referred to. As soon as it recognizes this data, the handover unit 99 causes it to be stored in a handover buffer memory 105 via a control link 104. Finally, the unit 99 receives the handover command over the same channel; it stores this command, which is also transmitted to the processor 101. The command can include a time of application. At this precise time the processor 101 repoints the antenna 90. This would normally interrupt communication but at the same time, by means of a command 107, it switches the switch 96 to the memory 105 and activates the latter via the link 104. The data from the buffer memory 105 maintains the stream of data at the user output 97.

It is clear that at this time any data supplied to the user input 93 must be used locally or stored temporarily. Thus the dashed outline frame 106 indicates a data terminal equipment the function of which is to provide at the output 97 data from the buffer memory 105 fetched by commands received at the input 93 and processed locally; this aspect is outside the scope of the invention and will not be described further. If the communication channel were to route data quasi-continuously, the commands received at the user input 93 would not generally be processed locally. They would be stored, but this is no disadvantage since users readily accept a slight time-delay under these conditions.

After the end of the handover period, the command processor advises the unit 99 that handover has been completed. The unit 99 then returns the switch 96 to the position shown in FIG. 3. From this time the is communication channel is via the demodulator 95 and the switch 96, as before.

The time for which continuity of transmission to the user output 97 has been maintained using the data written for this purpose into the buffer memory 105 is essentially the time needed to repoint the antenna 90. In the case of an array antenna, this time is measured in milliseconds. In the case of a mechanical antenna, as shown, it is measured in seconds. The buffer memory 105 is sized accordingly, as is the additional communication channel 87 (FIG. 2). Of course, this time further includes resynchronization times added by the communication protocol before any new communication channel is established.

There is claimed:

1. Communication system comprising a set of non-geostationary satellites providing communication links between ground stations and terminals, a communication link from a particular station via a first satellite terminating at associated terminals in a limited geographical area including said station, and providing a communication channel for at least some of said associated terminals, said communication link being subsequently transferred to a second satellite during a communication link handover, wherein said communication link between said particular station and its associated terminals includes an additional communication channel adapted to enable advance data to be transmitted between said particular station and a terminal before said terminal executes said communication link handover, said advance data being data other than data required to execute said communication link handover, said advance data being used to maintain a local communication for masking any interruption of communication caused by said communication link handover.

2. Communication system according to claim 1 wherein said advance data includes data to be transmitted between said particular station and said terminal for a period equal to that required in said terminal to execute a communication link handover.

3. Communication system according to claim 2 wherein said terminal has a single steerable antenna and said required period essentially comprises the maximal time required to repoint said antenna from one satellite of the communication system to another satellite and the resynchronization time.

4. Communication system according to claim 1 wherein said terminal comprises:
   an additional receive subsystem associated with said additional communication channel;
   a memory for storing data supplied by said additional receive subsystem when transmitted to said additional receive subsystem by said particular station; and
   a switch operative at the time of said communication link handover in the terminal so that said data in said memory is fed to said communication channel of said terminal when said communication is interrupted by said communication link handover in said terminal.

5. Communication system according to claim 1 wherein, at a time of said communication link handover, said station is adapted:
   to transmit to said second satellite without ceasing to transmit to said first satellite,
   to select a first active terminal,
   to obtain said advance data to be transmitted to said first active terminal,
   to transmit said advance data to said first active terminal over said additional communication channel,
   to transmit to said first active terminal a communication link handover instruction,
   to select a second active terminal, and
   to continue this process unit communication link handover has been completed in all active terminals, after said completion said particular station ceases to transmit to said first satellite.

6. Communication system according to claim 5 wherein selection of said first active terminal is accompanied by selection of at least one other active terminal, said advance data is obtained from the selected active terminals and said advance data is transmitted by said selected active terminals, to thereby effect communication link handover in groups of terminals.

7. A method for performing a communication link handover in a communication system comprising a set of non-geostationary satellites providing communication links between ground stations and terminals, a communication link from a particular station via a first satellite terminating at associated terminals in a limited geographical area including said station, and providing a communication channel for at least some of said associated terminals, said communication link being subsequently transferred to a second satellite during a communication link handover,
   wherein said communication link between said particular station and its associated terminals includes an additional communication channel adapted to enable advance data to be transmitted between said particular station and a terminal before said terminal executes said communication link handover, said advance data being data other than data required to execute said communication link handover, said advance data masking any interruption of communication caused by said communication link handover,
   said method comprising:
      maintaining transmission between said particular station and said second satellite without ceasing transmission between said particular station and said first satellite,
      selecting a first active terminal,
      obtaining said advance data to be transmitted to said first active terminal,
      transmitting said advance data to said first active terminal over said additional communication channel,
      transmitting to said first active terminal a communication link handover instruction,
      selecting a second active terminal, and
      continuing this process unit communication link handover has been completed in all active terminals, after said completion ceasing said transmission between said particular station and said first satellite.

8. The method according to claim 7, wherein said selecting said first active terminal is accompanied by selecting at least one other active terminal, obtaining said advance data from the selected active terminals and transmitting said advance data by said selected active terminals, to thereby effect communication link handover in groups of terminals.

* * * * *